United States Patent [19]

Lang et al.

[11] 4,381,281
[45] Apr. 26, 1983

[54] REACTOR AND PROCESS FOR PRODUCTION OF NOVEL NUCLEAR FUEL

[75] Inventors: Linton W. Lang, Richland, Wash.; Robert L. Stetson, Pacifica, Calif.

[73] Assignee: Pacific Nuclear Fuels, Inc., Richland, Wash.

[21] Appl. No.: 215,161

[22] Filed: May 4, 1981

Related U.S. Application Data

[63] Continuation-in-part of Ser. No. 861,285, Jan. 20, 1978, abandoned.

[51] Int. Cl.$^3$ .............................................. G21C 3/28
[52] U.S. Cl. ................................... 376/172; 376/267; 376/181
[58] Field of Search ................... 423/3; 376/172, 173, 376/181, 267

[56] References Cited

U.S. PATENT DOCUMENTS

| | | | |
|---|---|---|---|
| 2,951,023 | 8/1960 | Seaborg et al. | 176/17 |
| 3,042,598 | 7/1962 | Crowther | 176/16 |
| 3,309,277 | 3/1967 | Jaye et al. | 176/16 |
| 3,640,844 | 2/1972 | Shank et al. | 176/18 |
| 3,658,644 | 4/1972 | Lang | 176/18 |
| 3,671,392 | 6/1972 | Beaudoin et al. | 176/18 |
| 3,773,615 | 11/1973 | Blatter | 176/17 |

OTHER PUBLICATIONS

Nuclear Applications, vol. 5, 11/68, pp. 302–309, Lang (II).
BNL–483, 1958, pp. 38, 40, 41.
Nuclear Applications & Technology, vol. 9, 8/70, pp. 242–249, Lang (III).
HW–76922 RD W/DEL, 3/15/63, pp. 3, 11–19, 28, 29.
HW–81870, W/DEL, 4/22/64, pp. 1–18.
HW–79917, 12/10/63, pp. 1–4.
HW–79916, 12/10/63, pp. 1–6.
HW–79915, 12/10/63, pp. 1–4.
HW–80289, Rev. W/DEL, 1/31/64, pp. 1–45.
HW–54839, 2/4/58, pp. 1–4.
DP–279, 4/58, pp. 1–17.
HW–76847, W/DEL, 3/21/63, pp. 1–49.
HWN–632 EX, 12/9/54, pp. 1–7.
HW–32774 EX, 1/1/55, pp. 1–3.

*Primary Examiner*—Harvey E. Behrend
*Attorney, Agent, or Firm*—Alfons Puishes

[57] ABSTRACT

The production of a novel nuclear fuel, utilizing uranium 233 low in uranium 232 content in combination with other nuclear materials is made possible by utilization of an equally novel reactor configuration and method of operation. Uranium 233 is produced from thorium in a light water reactor (LWR) while utilizing discrete separation of the thorium being irradiated from the fissile fuel. This uranium 233 is then incorporated directly as fissile isotope enrichment into a new nuclear fuel which may be done without encountering the usual difficulties and hazards in the handling of uranium 233 or the expense and delays associated with gaseous diffusion enrichment. Thorium from this process may be directly reprocessed for reactor charging without radiation hazard also.

3 Claims, 6 Drawing Figures

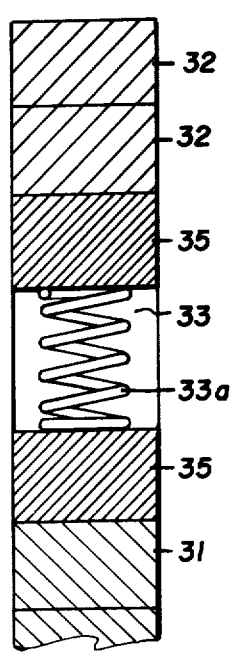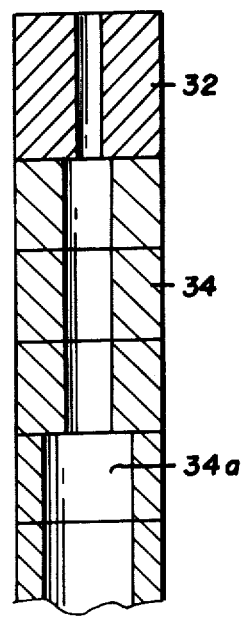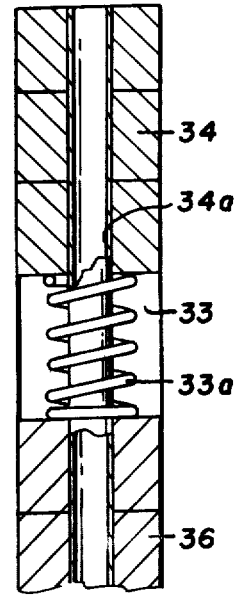
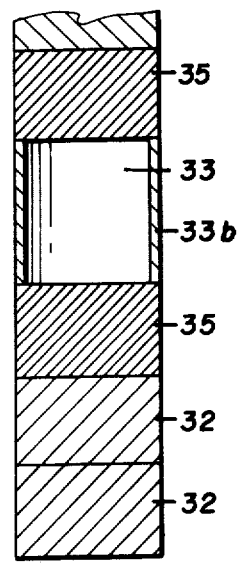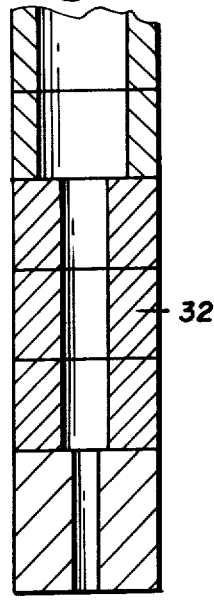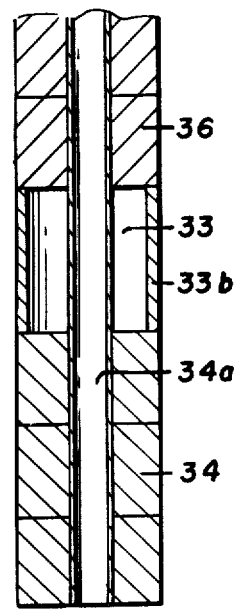
FIG. 2A    FIG. 2B    FIG. 2C

REACTOR AND PROCESS FOR PRODUCTION OF NOVEL NUCLEAR FUEL

This application is a continuation-in-part of co-pending application Ser. No. 861,285 filed Jan. 20, 1978, now abandoned.

BACKGROUND OF THE INVENTION

The impending energy crisis has been occupying considerable attention of scientists and power engineers in recent years. The dependence on nuclear fuels for the future appears more than likely. ("Power in the Year 2001"—Mechanical Engineering, December 1971.)

Of the well known fissionable isotopes used for nuclear fuel enrichment, namely plutonium 239 and 241, uranium 235 and uranium 233, the latter has for some time appeared to offer the best economic possibilities for light-water reactors. This is based largely on the fact that the isotope thorium 232 from which uranium 233 is derived by nuclear reaction is in abundant supply. ("Thorium and the Third Fuel"—Joseph M. Dukert—U.S. Atomic Energy Commission.) Not only is thorium more abundant, but uranium 233 when burned as fuel produces more neutrons per atom destroyed than does uranium 235.

Practical aspects and problems of the utilization of uranium 233 for power generation have been explored by one of the instant inventors and set forth in the literature. ("Power Cost Reduction by Cross-Progeny Fueling of Thermal and Fast Reactors"—L. W. Lang, NUCLEAR APPLICATIONS, November 1968; and "Utility Incentives for Implementing Crossed Progeny Fuelings"—L. W. Lang, NUCLEAR APPLICATIONS AND TECHNOLOGY, August 1970.)

While it has been recognized that uranium 233 has many advantages as a fuel for power reactors its use has been accompanied by numerous disadvantages and problems. Most of these stem from the fact that the production of uranium 233 from thorium 232 is usually accompanied by the formation of uranium 232 and its daughter, thorium 228. These isotopes create radiation problems in the separation and fuel preparation processes as well as difficulties in reactor charging. Generally the presence of uranium 232 in over ten parts per million (ppm) in the final fuel embodiment is considered undesirable; under 10 ppm the fuel is termed "clean."

As is well known to those skilled in the art, different reactor concepts produce different results when the thorium cycle is employed. To the present time thorium has been considered best utilized in the high temperature gas cooled reactors (HTGR) and molten-salt reactors (MSR). Its use in light-water reactors (LWR), both pressurized and boiling, has heretofore not been looked upon with much favor. ("The Role of Thorium in Power Reactor Development"—P. R. Kasten, ATOMIC ENERGY REVIEW, IAEA Vienna 1970; "Molten Salt Reactors"—H. G. MacPherson, INTERNATIONAL CONFERENCE, CONSTRUCTIVE USES OF ATOMIC ENERGY, 1966.)

Consideration of the thorium cycle has otherwise been generally confined to breeder reactors. The production of clean uranium 233 for use in power reactors is covered by a patent of one of the instant inventors, namely L. W. Lang, U.S. Pat. No. 3,658,644. This uses a fast breeder reactor (FBR) and novel combinations of reactor core and blanket.

Actually until the time of the present invention a truly clean U-233 enriched reactor fuel having less than ten parts per million of uranium 232 has not been produced commercially for use in practical power reactors. The use of uranium 233 as a reactor fuel has been largely limited to the experimental stage.

All previous systems utilizing thorium as a fertile material in power reactors have certain basic similarities. The thorium is mixed with a fissile driver fuel such as uranium 235. As the uranium 235 fissions the fertile fuel, thorium, is converted to uranium 233 as is well known to those skilled in the art. Continued irradiation, particularly by the fast neutrons from the driver fuel, namely those of an energy content greater than six Mev, create the undesirable isotope, uranium 232, described above. These fast neutron reactions result also from continued irradiation of the uranium 233 which has been formed and fissions in situ. The fissioning of the bred uranium 233 limits the length of irradiation and there remains the hitherto unsolved problem of thorium irradiation in thermal reactors.

Specifically, difficulties in producing "clean" U-233 fuels stem from the fact that thorium 232 can be transformed to protoactinium 231 by extremely energetic neutrons (greater than 6 Mev). The protoactinium 231, by simple neutron capture, forms uranium 232 in the following series of reactions:

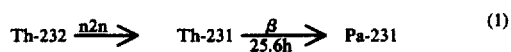  (1)

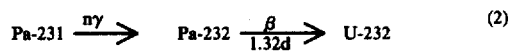  (2)

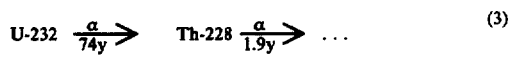  (3)

The U-232 decays with a 74 year half-life to Th-228 which in turn has a 1.9 year half-life and heads a decay chain of short-lived isotopes some of which give off highly energetic beta and gamma radiation. Since chemical separations do not segregate isotopes of the same element, the U-232 is separated with the U-233 and when the former builds up to high levels, handling by remote methods is required. Similarly, the build-up of Th-228 denies re-use of the thorium.

By separating thorium from the fissioning driver fuel the incidence of highly energetic neutrons, required to produce Pa-231 by (n, 2n) Th-232 reaction, is reduced. However, the U-233 formed in situ can in turn fission by thermal neutron absorptions. Thus, the U-233 produced from thermal neutron capture by Th-232 eventually limits the length of the irradiation since its fissioning produces energetic neutrons capable of forming Pa-231.

Chemical processing of reactor fuels is a highly developed art. Thus, it is well known that uranium and thorium can be coprocessed using solvent extraction or similar methods, dividing the uranium and thorium into separate process streams. These separate streams can then be concentrated and converted to solids for fabrication into fuel elements. Where previously irradiated fissionable fuel is involved, provision is made for extracting and disposing of the fission products and for extracting and recycling plutonium as nuclear fuel. Fission element assay methods are available for determining the fissile content of the reactor fuel, both in-core and in subsequent chemical processing.

It is, accordingly, a general object of the invention to provide a thorium fueled light-water cooled nuclear reactor wherein (n,2n) reactions are minimized and, hence, production of U-232 is minimized. It is a further object of the invention to provide for co-processing of the irradiated thorium with uranium so as to produce a U-233 enriched fuel in which the U-232 is diluted to safe handling levels.

SUMMARY OF THE INVENTION

We have discovered that by utilizing the novel reactor configuration and method of operation of our invention, which includes the use of special fuel elements and assemblies, we are able to produce uranium 233 low in U-232 content in a light-water reactor (LWR), either pressurized or boiling, operating with neutrons in the thermal range. We are consequently able to solve the safety and fuel fabrication problems and produce a new and superior fuel by combining this uranium 233 with other fissile and fertile materials. This results in a much more highly efficient nuclear power reactor fuel than has heretofore been possible, as set forth below.

More specifically, we use a reactor configuration which separates, physically, the fertile thorium from the active fuel and which incorporates the use of a novel fuel element. This separation or segregation makes it possible for us to control the irradiation so that the thorium may be removed before it is subjected to appreciable action of fast neutrons thereby holding the formation of uranium 232 to a minimum.

We then process the irradiated thorium by means of a separation process whereby the uranium 233 is safely incorporated directly into uranium for future use as fuel in a power reactor. We have discovered that such a clean uranium 233 fuel may be produced by using all or part of the depleted uranium reactor fuel from our reactor, depleted uranium from other reactors, uranium tails from the gaseous diffusion process, and/or natural uranium, thus producing a novel power reactor fuel.

We have discovered that by use of our invention we are able to keep the amount of uranium 232 formed in thorium down to less than 10 ppm in the final fuel embodiment. This permits us to solve all the problems heretofore associated with the use of uranium 233 as set forth above.

DESCRIPTION OF THE DRAWINGS

FIG. 2A is a diagrammatic longitudinal section of a single active fuel rod showing an arrangement of fissile and fertile fuels.

FIG. 2B is a diagrammatic longitudinal section of a fertile fuel rod.

FIG. 2C is an alternate embodiment of the element of FIG. 2A.

DESCRIPTION OF A PREFERRED EMBODIMENT

Figure 1:
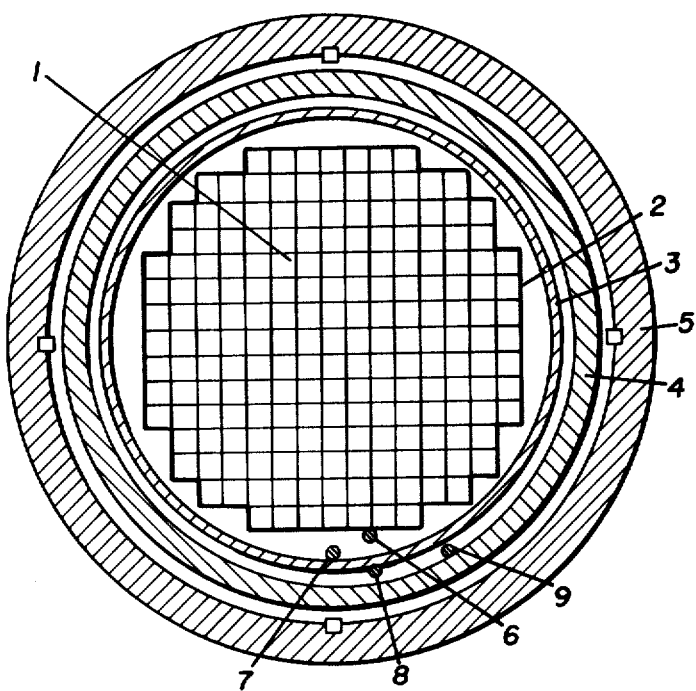
FIG. 1 is a diagrammatic partial cross-section through a reactor of our invention showing relative location of the principal components.
Figure 1A:
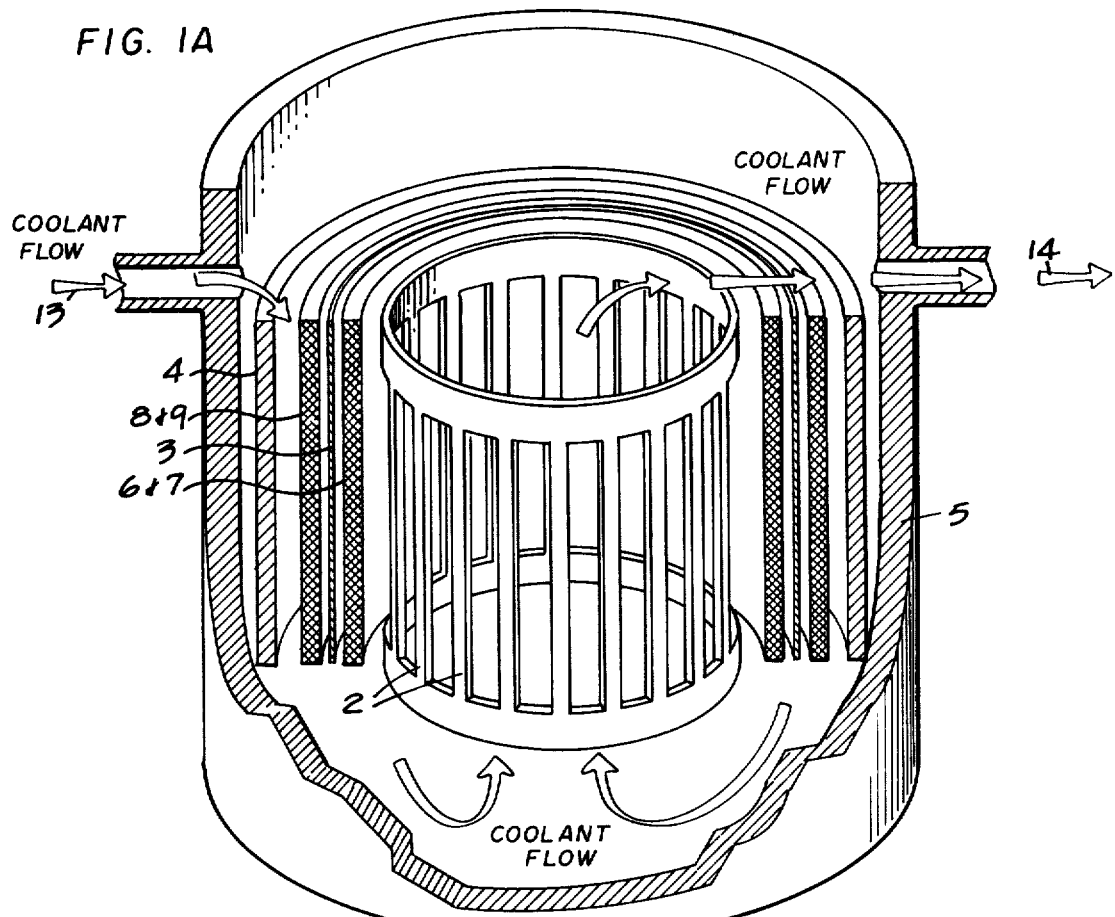
FIG. 1A is a diagrammatic partial longitudinal section through our reactor vessel.
Figure 1B:
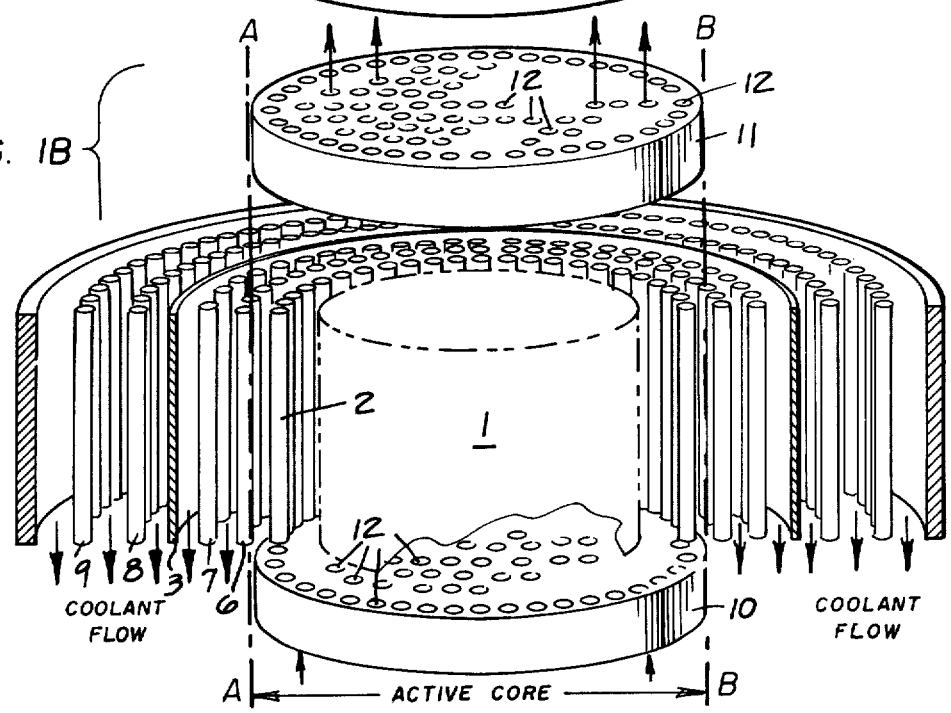
FIG. 1B is a functional schematic view of our active core and blanket.

Referring now especially to FIGS. 1, 1-A and 1-B there is seen the active core 1 of the reactor in which are positioned the active, or driver fuel elements of the type shown in FIG. 2-A. Also forming a part of this component is our core baffle 2 positioned around the periphery of the central core and comprising fuel elements of the type shown on FIG. 2-B. The latter is shown more clearly in FIG. 1-A and conceptually in FIG. 1-B, the broken lines A-A and B-B denoting the geometric limitations of the active core. It can be seen that the core baffle 2 actually surrounds and delimits the active core.

Core barrel 3 and thermal shield 4 are clearly indicated as located inside pressure vessel shell 5. Positioned around the central active core are shown the blanket elements which in general comprise fuel elements of the type shown in FIG. 2-B and containing primarily the fertile thorium fuel. The first two series of elements positioned between the outside of the core baffle and the inside of the core barrel are shown at 6 and 7 respectively.

A second series positioned on the outside of the core barrel and the inside of the thermal shield are shown at 8 and 9 respectively. All of these are best seen on FIG. 1-B in their relative positions and are shown in combined form on FIG. 1-A. It is seen how the elements shown at 2 form both a part of the blanket arrays and part of the active core, the reason for which is evident from the description of operation given below.

The upper and lower ends of the fuel elements 32 of FIG. 2-A comprising as they do fertile thorium serve also to form the top and bottom portions of a complete blanket around the active core.

A lower support grid plate 10 is of a more or less conventional type and serves to hold the fuel elements comprising the active core. An upper grid plate 11 which is removable is also of a more or less conventional type. Circular openings 12 in the grid plates serve to accommodate the fuel elements.

The coolant inlet to the reactor is shown at 13 and the outlet at 14, the direction of flow being indicated by the arrows inside the reactor vessel.

The method of mechanical positioning or support of the elements comprising the outer blanket arrays may be by a separate grid plate not shown, but disposed for removal and reinsertion of the fuel elements in the course of operation of the reactor after removal of the vessel head (also not shown).

As thus arranged and positioned the components of our reactor combine to function and permit the operation of our reactor in the novel manner and produce the novel results set forth and claimed below.

Referring now to FIG. 2 and first to FIG. 2A there is shown diagrammatically the relative position of the various components of an individual fuel rod. At 31 there is seen diagrammatically the active fuel which may comprise enriched uranium oxide ($UO_2$) pellets encased in reactor fuel tubing. The tubing may be of zircaloy, stainless steel or other material having similar nuclear properties. There is also seen at 32 the fertile fuel which may comprise thorium oxide ($ThO_2$) pellets likewise enclosed in the reactor fuel tubing. In plenum chambers 33 there is positioned a spring 33a and a spacer 33b. The spring may be of helical configuration. This component of our invention serves to provide necessary expansion for the collection of fission gases, as well as for the separation of the active or fissile fuel from the fertile fuel for reasons which are developed more fully below.

Where further separation of the kind is required, we replace the fertile material and/or active fuel with inert or neutron moderating material at 35.

The above described fuel rods represent the fuel rods located throughout the active core. The position of the fertile material at the top and bottom of the rods serves to form a top and bottom blanket of thorium in the core.

Referring now to FIG. 2B there is seen another fuel rod in which like numbers represent like components. In this case the rod consists entirely of thorium pellets 32 and this is the fertile material which is shown located as part of the blanket at positions 6, 7, 8, and 9 of FIG. 1. In addition, as noted previously, we provide for an outer annular blanket of thorium within the active core by replacing the active fuel rods adjacent to the core baffle 2 with fertile thorium rods of FIG. 2B.

For these blanket arrays, only one, each, of which is shown in FIG. 1, we install rod holders on the outside of the core baffle, inside the core barrel, outside the core barrel, and inside the thermal shield to hold the thorium-filled rods.

We locate these rods in contiguous arrays; or we space them out (depending upon the neutron flux and time of irradiation at each specific location). The pellets contained in these rods may be hollow or solid or a mixture of solid and hollow pellets 34 corresponding in a roughly inverse manner to the reactor flux profile; the significance of the hollow pellets is detailed below.

FIG. 2C represents an alternate embodiment of the fuel rod of FIG. 2A. In this embodiment we utilize hollow pellets of thorium 34 and active fuel 36 to form an annulus within which at 34a moderating material may be included, e.g., water from the reactor coolant system.

Thorium pellet sizing and configuration described above is for the purpose of minimizing fast neutron reactions in thorium due to fissioning of the uranium 233 after it is formed. This allows us to maximize uranium 233 formation per unit thorium prior to significant build-up of uranium 232. Specifically, we have discovered that these pellet geometries allow a major fraction of the fast neutrons to escape from the thorium before they have a chance to interact with it. We refer to this as the escape probability for the fast neutrons of concern, i.e., those with energies greater than 6 Mev.

Thus, we have discovered this escape probability to be approximately 90% for an infinite array of zircaloy rods containing solid thorium (ThO$_2$) pellets one-half inch in diameter. Specifically, about 90% of all neutrons from internal U-233 fissioning leave the thorium pellet before interacting. Of the remaining 10% that do interact, only a small fraction are energetic enough to result in the conversion of thorium to U-232; and of these a smaller fraction still (~20%) actually produce the (n,2n) reactions of equation (1) above.

We have discovered further that we can increase and enhance the fast neutron escape probability (and, hence, minimize [n,2n] reactions on thorium) by employing hollow thorium pellets as described above, and by introducing neutron moderating material such as the water coolant from the reactor into the hollow space. Specifically, we have discovered that for hollow cylindrical pellets as we thin down the cylinder wall the probability increases that internally born fast neutrons escape before interacting with thorium.

We have calculated the reduction in fast (above 6 Mev) neutron reactions accomplished by hollowing out the pellets and inserting neutron moderator. For one-half inch cylindrical thorium pellets contained within zircaloy tubing as above, with two-thirds of the internal pellet volume replaced by light-water, reactions within the thorium pellet attributable to neutrons greater than 6 Mev are reduced 33.2% relative to formation of the U-233 product. That is, for a given rate of U-233 production per unit weight of thorium charge, reactions due to neutrons greater than 6 Mev are reduced 33.2%; or, aproximately one-third more fast neutrons escape (and are reduced below 6 Mev in energy by the intervening moderator) than was the case for the solid pellet (90% escape probability). Our calculations show that with further thinning of the pellet wall the fast neutron escape probability continues to increase relative to the U-233 production rate, ultimately approaching 100% for very thin-walled pellets.

Our discovery of these methods whereby we can maximize the fast neutron escape probability preferentially relative to U-233 production in thorium target material is important for the successful production of clean U-233 in quantity under our invention.

Finally, the segregated thorium embodiment described above performs an additional function important to our invention. Many of the neutrons from the core of the reactor are normally absorbed in the surrounding moderator (water) or absorbed in the structural components. By placing thorium fertile material in these locations the life of the structural components is increased by the reduced neutron absorptions and many of the neutrons are usefully utilized (to form U-233). Of course, some of the neutrons that leak from the core sustain repeated atomic collisions and re-enter the core (are reflected). These neutrons likewise will be reduced because of the thorium absorptions. However, this subtraction of neutrons can be compensated for rather easily by removing some of the neutron absorbers (poison) that are inserted in the core to control the chain reaction after charging undepleted fuel. In other cases, fuel containing slightly higher enrichment can be used. Also, by configuring the in-core top and bottom thorium blankets in predetermined ways we achieve useful flux and power distribution functions in the active core region.

Operation

The method of charging and operating our reactor comprises an important part of our invention. To demonstrate the effectiveness of our invention a typical example will be analyzed.

1. Period of Irradiation

Under average conditions we irradiate for a period of one year using a power density of 50 kilowatts thermal per liter of core volume in the case of a boiling water reactor and 100 kilowatts thermal per liter of core volume in the case of a pressurized water reactor. We charge thorium into the reactor during regular annual refueling outages for power generating purposes. For a reactor delivering 1000 MW of electrical power, a twenty-ton (metric) charge of thorium (as metal or ThO$_2$) can be accommodated using the embodiments and configurations previously described. This amount of thorium constitutes a practicable charge size for purposes of producing U-233; depending upon U-233 yield requirements, lesser or greater amounts can be charged.

We have found that best results are obtained by utilizing an average driver fuel rod power output of approximately 7 KW (thermal) per foot.

We discharge thorium from the reactor during normal refueling outages also. We replace the in-core rods with new charge combinations depending upon location and length of desired irradiation. We replace the extra-core radial blanket rods less frequently, allowing 2 to 3 years irradiation for these.

2. Yield and U-232 Contamination

After 300,000 MWD (electrical) of normal reactor operation for power generating purposes (over a one-year period), the U-233 yield in our charge will be 100 to 125 kilograms. At present-day nuclear power costs a reasonable value for this U-233 is approximately $5 to $6 million. Using the above embodiments and thorium irradiation methods, we have discovered that the average U-232 content in the irradiated thorium charge will not be greater than 300 to 500 ppm (on an atom ratio, U-232/U-233, basis). However, when U-233 is used as driver fuel the U-232 content tends to build up on repeated recyclings, reaching an asymptotic value four to five times that of the first cycle. The existence of this equilibrium condition is based on the fact that U-232 ultimately is destroyed (by continuous neutron irradiation in the reactor) as rapidly as it is formed or added in by recycling. These and other possible sources of U-232 build-up are countered by the dilution effect, described below, as U-233 is processed and recycled as fuel. (Other sources of U-232 include neutron reactions on the naturally-occurring isotope, Th-230, similar to equations (1) to (3) above, Th-230 sometimes being present as a natural constituent of thorium ores.) Thus, in the final driver fuel embodiment (where the U-233 content is of the order of 2 to 3%) the U-232 contamination will not exceed 10 ppm based on the total uranium present.

3. Chemical Processing and Fuel Use

Following irradiation of the thorium charge in the LWR, we chemically process it for direct incorporation of the U-233 into uranium for use as a reactor fuel. We have discovered that the most efficient and safest way to use our clean U-233 product is to co-process the irradiated thorium charge with uranium. The uranium may be in the form of irradiated reactor fuel (from the same or other LWR plants), depleted uranium tailings from U-235 isotopic enrichment process, or natural uranium. Since the U-233 and accompanying U-232 are both diluted 33 to 50 times in the process (the final fuel product containing 2 to 3% U-233), the U-232 content of the final uranium fuel product will not exceed 10 ppm based on the total uranium present, giving due allowance for possible Th-230 contamination of the original thorium ore and repeated recycling U-232 build-up.

The major steps in the post-irradiation processing of our thorium-uranium charge are as follows:

Step 1—Charge Preparation

After a fuel cooling period, we section the fuel rods by guillotining or similar technique. That is, we cut off the ends of the rods so as to include all of the irradiated thorium plus a predetermined amount of the ends of the active fuel sections. We combine these end sections and selected rods from the radial arrays and with uranium from one or more of the sources cited above.

Step 2—Co-dissolution of Thorium and Uranium

The combined thorium-uranium charge is co-dissolved for chemical processing. Dissolution requires nitric acid treatment with the assistance of hydrofluoric acid. Other processes under development, involving use of volatilization methods, may be appropriate here also. Also, the limited solubility of thorium may be used to advantage in processing to segregate it from streams containing uranium (and plutonium, when present).

Step 3—Thorium Separation

The outermost thorium blankets are lowest in U-232 content. Therefore, significant amounts of Th-228 (the progeny of U-232) are not present. We are thus able to recover that thorium and prepare it directly for recycle and production of additional U-233. The remainder of the thorium charge must be stored for several years to permit the Th-228 to decay before recycling. For complete extraction of the U-233 from the thorium charge one year out-of-reactor is required to permit completion of the reaction:

$$\text{Pa-233 } \beta/27.4d \text{ U-233} \tag{4}$$

Step 4—Uranium Separation

After blending all of the uranium isotopes together (U-233 from our thorium charge, U-235 and U-238 from natural and/or depleted uranium), we extract and separate the entire isotopic mixture, as uranium, in preparation for fabrication as reactor fuel. By proper proportioning of the driver isotopes, U-233 and U-235, in this processing step we achieve the precise level of enrichment (or driver fuel concentration) desired in the final fuel embodiment. Additional processing steps are added to remove fission products and plutonium, when present.

Step 5—Fuel Fabrication

In the final step of our fuel processing, the combined uranium isotope matrix (containing < 10 ppm U-232) is concentrated and converted to reactor fuel in normal uranium fuel fabricating facilities. Plutonium may be combined with thorium and recycled as fuel in a similar manner to the process we use for combining U-233 and uranium.

Depending upon the material inputs and fuel products desired, we vary the method of incorporating the clean U-233 into the uranium fuel matrix. The essential features of our process in all cases are:

(1) We produce a thorium-free uranium fuel using U-233. This is important in order to prevent future build-up of U-232 from thorium as is the case with present fuels where U-233 and other driver fuels are burned in the presence of thorium.

(2) We produce U-233 relatively free from the contaminating U-232 isotope. Dilution with uranium during processing produces a clean reactor fuel as defined above.

(3) We produce a new and novel fuel that utilizes a uranium matrix with the fissile isotopes, U-233 and U-235, as driver; plutonium can be added, also.

(4) We produce a fuel that can be fabricated and handled in the same manner as U-235 enriched uranium and which is a more efficient fuel for LWR's than the latter. Thus, we estimate that the total heat generating capacity can be increased as much as 25% when U-233 is substituted for U-235, and up to 50% when U-233 is substituted for Pu-239. If the neutronic properties are fully utilized in a "hardened spectrum" reactor (i.e., a LWR in which the average neutron energy is increased), the total heat generating capacity is increased by an additional 20% in both cases. This includes the fissioning of all progeny in every case.

(5) We produce a clean U-233 driver fuel which can be combined directly with uranium so as to reduce or eliminate costly requirements for U-235 enrichment by the gaseous diffusion process and its accompanying process steps, all of which are time-consuming and require large quantities of power. also, using U-233 in place of U-235 conserves the latter as the only naturally-occurring fissile fuel.

(6) By guillotining or sectioning the rods to include the irradiated thorium together with the ends of the active uranium fuel columns, we optimally blend the U-233 with the least depleted uranium from the core. Since the costs for uranium enrichment per unit include fixed and variable charges we minimize enrichment costs associated with the spent uranium fuel that is not processed with thorium: i.e., the unit uranium enrichment costs (which are maximum for the fuel of the least depletion or burnup) are decreased.

(7) With each successive mixed fuel enrichment with U-233 the synthetic fuel gains efficiency because the naturally occurring U-235 is burned out and replaced with the more efficient U-233. Once uranium has been enriched with U-233, it must be re-enriched upon reactor depletion with U-233 or relatively pure U-235.

(8) In uranium-fueled reactors a neutron multiplication is obtained from the fast fissions of U-238. This phenomenon is enhanced with U-233 because the fission-to-absorption ratio is not reduced by energetic neutrons as much as the fission-to-absorption ratio with U-235.

(9) In the ultimate U-233 fuel embodiment (represented by FIG. 2C) we have found that the value of improved fuel performance to the reactor operator exceeds that from the concomitant production of U-233. Thus, in this embodiment, we not only achieve optimum moderation (using reactor water coolant) for the top and bottom thorium blankets; but, in addition, we approach optimum utilization of U-233 as a nuclear fuel. By utilizing internal and external cooling of the fuel rods we can harden the spectra by slightly increasing the diameter of the fuel rod and thus increasing the fuel to moderator ratio. By effectively using internal and external cooling we remove the melting point of fuel as a reactor limit and can increase the specific power of the fuel. Such an increase would allow a reduction in reactor size for a given rated power. With U-233 in uranium fuel and a hardened neutron spectra, breeding in light-water reactors would be approached (as noted in the previously cited literature reference to Lang).

The above listed design features and earlier description should not be construed as limiting since various modifications can be made as previously noted without departing from the scope of the invention. It is intended that the invention be limited in scope only by the appended claims.

The novelty of this invention lies in the deliberate segregation and distribution of fertile thorium with respect to the driver fuel in the fabrication and charging of the fuel assemblies, followed by dilution of any U-232 formed by coprocessing the irradiated thorium with uranium. The effect is to minimize the occurrence of (n,2n) reactions due to neutrons greater than 6 Mev in energy which in turn minimizes production of unwanted U-232. Minimum U-232 production consistent with good power generating performance can be achieved with the invention described herein. U-232 dilution further reduces the problem for the remaining U-232 formed. This results in a U-233 driver fuel that can be more safely and efficiently utilized than previously achievable.

We claim:

1. A method of production of a novel nuclear fuel comprising the steps:
(A) initially charging a light-water nuclear reactor with fertile thorium fuel elements and fissile uranium core elements in predetermined arrangements; wherein the thorium is segregated from the uranium and wherein some of said thorium fuel elements are extra-core fuel elements;
(B) irradiating said thorium fuel elements and said fissile uranium core elements at an averge driver fuel rod power output of approximately 7 kw thermal per foot;
(C) continuing said irradiation of said extra-core thorium fuel elements for a period of two to three years at a power density of 50 to 100 kw thermal per liter;
(D) thereafter removing and replacing preselected ones of said thorium fuel elements and said fissile uranium fuel elements;
(E) further continuing said irradiation of the non-removed thorium fuel elements until the U-232 content in the U-233 averages 300 to 500 parts per million;
(F) removing and co-dissolving only said thorium fuel elements together with natural uranium in the proportion of 2 to 3% U-233 in total uranium;
(G) separating the uranium isotopes from those of other elements present;
thereby producing a fissile fuel comprising U-233 with a U-232 content of less than 10 parts per million in total uranium.

2. A method of production of a novel nuclear fuel comprising the steps:
(A) initially charging a light-water nuclear reactor with fertile thorium fuel elements and fissile uranium core elements in predetermined arrangements; wherein the thorium is segregated from the uranium and wherein some of said thorium fuel elements are extra-core fuel elements;
(B) irradiating said thorium fuel elements and said fissile uranium core elements at an average driver fuel rod power output of approximately 7 kw thermal per foot;
(C) continuing said irradiation of said extra-core thorium fuel elements for a period of two to three years at a power density of 50 to 100 kw thermal per liter;
(D) thereafter removing and replacing preselected ones of said thorium fuel elements and said fissile uranium fuel elements;
(E) further continuing said irradiation of the non-removed thorium fuel elements until the U-232 content in the U-233 averages 300 to 500 parts per million;
(F) removing and co-dissolving only said thorium fuel elements together with depleted uranium tailings from U-235 isotopic enrichment process in the proportion of 2 to 3% in totaluranium;
(G) separating the uranium isotopes from those of other elements present;
thereby producing a fissile fuel comprising U-233 with a U-232 content of less than 10 parts per million in total uranium.

3. A method of production of a novel nuclear fuel comprising the steps:
(A) initially charging a light-water nuclear reactor with fertile thorium fuel elements and fissile uranium core elements in predetermined arrangements; wherein the thorium is segregated from the uranium and wherein some of said thorium fuel elements are extra-core fuel elements;

(B) irradiating said thorium fuel elements and said fissile uranium core elements at an average driver fuel rod power output of approximately 7 kw thermal per foot;

(C) continuing said irradiation of said extra-core thorium fuel elements for a period of two to three years at a power density of 50 to 100 kw thermal per liter;

(D) thereafter removing and replacing preselected ones of said thorium fuel elements and said fissile uranium fuel elements;

(E) further continuing said irradiation of the non-removed thorium fuel elements until the U-232 content in the U-233 averages 300 to 500 parts per million;

(F) removing and co-dissolving only said thorium fuel elements together with depleted uranium from prior reactor irradiation in the proportion of two to three percent U-233 in total uranium;

(G) separating the uranium isotopes from those of other elements present;

thereby producing a fissile fuel comprising U-233 with a U-232 content of less than 10 parts per million in total uranium.

* * * * *